United States Patent [19]

Perron, III

[11] Patent Number: 4,919,030

[45] Date of Patent: Apr. 24, 1990

[54] VISUAL INDICATOR OF TEMPORAL ACCURACY OF COMPARED PERCUSSIVE TRANSIENT SIGNALS

[76] Inventor: Marius R. Perron, III, 2815 Swandale, San Antonio, Tex. 78230

[21] Appl. No.: 418,654

[22] Filed: Oct. 10, 1989

[51] Int. Cl.⁵ ............................................. G09B 15/00
[52] U.S. Cl. ............................. 84/470 R; 84/477 R; 84/484; 84/612; 84/652; 84/714
[58] Field of Search ................. 84/454, 464 R, 470 R, 84/477 R, 484, 612, 647, 652, 714

[56] References Cited

U.S. PATENT DOCUMENTS

| | | | |
|---|---|---|---|
| 3,905,269 | 9/1975 | Doerksen et al. | 84/470 R |
| 3,919,915 | 11/1975 | Isbell | 84/484 |
| 4,024,789 | 5/1977 | Humphrey et al. | 84/477 R |
| 4,078,469 | 3/1978 | Calvin | 84/477 R X |
| 4,089,246 | 5/1978 | Kooker | 84/470 R |
| 4,120,229 | 10/1978 | Ota | 84/454 |
| 4,364,299 | 12/1982 | Nakada et al. | 84/477 R |
| 4,402,244 | 9/1983 | Nakada et al. | 84/612 |
| 4,432,266 | 2/1984 | Nakada | 84/612 |
| 4,437,381 | 3/1984 | Chen | 84/484 |
| 4,484,507 | 11/1984 | Nakada et al. | 84/470 R X |
| 4,630,518 | 12/1986 | Usami | 84/610 |
| 4,651,612 | 3/1987 | Matsumoto | 84/470 R X |

*Primary Examiner*—Patrick R. Salce
*Assistant Examiner*—Emanuel Todd Voeltz
*Attorney, Agent, or Firm*—Thomas E. Sisson

[57] ABSTRACT

A visual indicator of temporal accuracy of compared percussive transient signals having a receiver for a reference input signal, a receiver for a performance or test input signal. An electronic circuit determines whether the first signal received is received by the reference input signal receiver or the performance input signal receiver. Further, the circuit determines the time difference between when the reference signal and the performance signals are received. A visual display indicates to the user whether the test signal is ahead or behind the reference signal and by how much it is ahead or behind. The indicator further displays an indication of when the two signals are received at substantially the same time.

3 Claims, 4 Drawing Sheets

VISUAL INDICATOR OF TEMPORAL ACCURACY OF COMPARED PERCUSSIVE TRANSIENT SIGNALS

BACKGROUND OF THE INVENTION

This invention relates to an electronic monitoring device and more particularly to a visual indicator of tempo accuracy. The present invention enables a musician, a sound technician, or engineer to visually determine whether a percussive transient sound being monitored occurs at the same time as a reference signal; and, if it does not occur at the "correct" time, the device visually indicates the magnitude of the temporal inaccuracy.

Music that sounds "tight" and not sloppy happens only when certain notes from different instruments occur together, at nearly the same instant. For example: a bass drum beat and a bass guitar note, a snare drum beat and a tambourine hit, a metronome beat and a bass drum, a rimshot and a rhythm guitar "chink", a cymbal crash and a bass drum beat, a keyboard stab and a snare drum. The present invention compares the timing of any two events, revealing which is ahead or behind and by how much.

There have been numerous devices noted in the prior art which are intended to provide musicians with comparisons of a measured reference parameter to that of an inputted parameter. U.S. Pat. No. 3,905,269 discloses an electronic rhythm teaching mechanism. The musical student inputs the correct timing parameter so that a metronome will click at the correct frequency. The device provides a light display portion which receives a card having musical notes inscribed upon it. The musical notes inscribed on this card represent the musical passage or exercise to which the student is to be tested. Upon reception of the first note played by the musical student, the electronic rhythm teaching machine will begin the judging process of comparing the playing of the monitored note and the referenced note for the remaining notes contained in the musical passage or exercise. If the musical student plays the subsequent note at the correct time, with the correct rhythm, this note is illuminated by the electronic rhythm teaching machine to inform the music student that the rhythm being played is correct. Should the musical student play the note at the wrong time, the electronic rhythm teaching machine will not illuminate the reference note, thereby informing the musical student that the presently played musical rhythm is incorrect.

Thus, the device of U.S. Pat. No. 3,905,269, essentially indicates whether the student has "passed or failed" in playing the musical selection. There is no visual display of the actual time difference of arrival between the compared rhythms, and there is no teaching of which rhythm input is first received by the measuring apparatus.

U.S. Pat. No. 3,919,915 discloses an electronic music conductor for generating a recording signal of different frequencies corresponding to the different beats in the meter of musical material simultaneously with the recording of the musical material.

Upon playing back the recorded signals, these signals are detected according to their frequencies and are utilized to illuminate lamps corresponding to the detected frequency. Illumination of lamps informs a performer, who is performing a live performance in conjunction with pre-recorded instrumental background music, the correct rhythm to be used in order to perfect the synchronism of the live performance with the playback of the recorded musical material.

U.S. Pat. No. 3,919,915 does not disclose nor teach the detection of two separate rhythms with a comparison step in order to determine whether the rhythms are in synchronism, but merely teaches the method and device for indicating to a performer the correct rhythm to be used during a performance.

An instrument tuner capable of electronically generating a visual display of a frequency difference between two frequencies is disclosed in U.S. Pat. No. 4,078,469. While the disclosed device teaches that the actual difference between a sustained reference frequency and a sustained inputted frequency can be visually displayed to the operator so that the operator can readily adjust the instrument to obtain a perfected pitch, the disclosure does not teach the measurement, detection, and comparison of the temporal relationship between a test, percussive transient input and reference percussive transient input as shown in the present invention.

Another electronic pitch tuner is disclosed in U.S. Pat. No. 4,120,229, wherein the device compares the frequency of an inputted musical sound signal from a microphone which is produced by a musical instrument to be tested with the frequency of a reference oscillator. The tuner utilizes a phase comparison between the reference frequency and the tested frequency to determine whether the frequencies are in synchronism with each other. Based upon this phase comparison, the electronic tuner visually indicates to the operator the status of the synchronism between the reference frequency and the frequency to be tested. More specifically, the electronic tuner indicates the difference in the pitch between the reference source and the instrument being tested. Again, the disclosure of U.S. Pat. No. 4,120,229 does not teach or disclose which signal is first received by the measuring apparatus, nor does it teach or disclose any visual display of an actual time difference between compared percussive transient signals.

An automatic performance device capable of adjusting the progress of an automatic performance in response to the depression of keys by a performer is disclosed in U.S. Pat. No. 4,484,507. This automatic performance device allows a performer and an automated performance to maintain the same tempo and rhythm throughout the performance. To achieve this result, the automatic performance device monitors the tempo and rhythm of the performer and compares this tempo and rhythm with the tempo and rhythm of the automatic performer. If the automatic performance device detects a difference between the measured tempo and rhythm and the automated tempo and rhythm, the automatic performance device will adjust its automated tempo and rhythm with respect to this difference so that the next note played by the performer should have the correct tempo and rhythm as that of the automatic performer. Thus, if the performer is depressing the keys in a fashion that is faster than the progress of the automatic performance, the automatic performance device will increase its tempo in order to overcome the time discrepancy between the manual and automatic performance. This is also the case if the manual performance is lagging behind the automatic performance. U.S. Pat. No. 4,484,507 does not disclose a display means for informing the performer of the discrepancies between the tempo of the performer and the tempo of the automatic performance.

Other prior art which discloses technical background of various electronic metronomes and tone teaching devices may be noted in U.S. Pat. Nos. 4,630,518; 4,089,246; 4,090,355; 4,437,381; and 4,024,789.

While the prior art may teach the concept of measuring a particular musical parameter, comparing this measured parameter with a reference parameter, and displaying to an operator the difference generated in the comparison step, such prior art lacks a distinct teaching on the arrival time between compared percussive transient signals and then visually representing any temporal disparity.

SUMMARY OF THE INVENTION

The present invention is an electronic instrument which enables a musician, sound technician, or sound engineer to determine whether a percussive transient signal is sounded in the correct moment in time. In other words, the present invention determines whether a certain signal, note, or sound has been initiated earlier than a correct instant in time, at the correct instant in time, or after the correct instant in time. The present invention not only determines the time relationship of the monitored note with respect to a targeted note, but the electronic instrument of the present invention also indicates to the monitoring operator whether the note was played too early, correctly, or too late so that the monitoring operator may compensate his or her sounding of the note or signal, thereby improving the temporal accuracy of future sounded notes.

The present visual indicator of temporal accuracy of percussive transient signals has two inputs which are capable of monitoring two separate sound sources. One of these inputs is connected to a first channel which is used as the reference input, while the second input is connected to a second channel which is used as the monitoring input. The referenced input (channel one) may be used to input a first signal from a source such as a metronome, a drum track of an accomplished musician who knows the correct tempo of the music being played, or other reference percussive transient signal. Channel two of the accuracy indicator is used to monitor a signal from a source to be tested or compared.

In operation, the present invention displays to the monitoring musician or technician whether the note played or inputted by the monitored source took place either before, at, or after the "correct" or reference note. The display also indicates to the monitoring musician or technician the amount of time that the monitored signal deviated from the referenced signal. For example, if a monitored musician plays a note before the sounding of the reference note, the monitored musician's note starts a timing clock. This timing clock continues to operate until the reference note is received by the indicator. The operation time of the timing clock is determined and sent to a visual display. The visual display informs the monitoring musician or technician that the monitored note was played before the reference note and further informs the monitoring musician or technician of the amount of time between the monitored note and the reference note.

In another situation, the musician may play the monitored note after the playing of the reference note. In this situation, since the reference note is prior to the monitored note, the reference note starts the timing clock. The timing clock continues to operate until the monitored note is received by the indicator. Again, the time that the timing clock operates is determined and sent to a visual display. This visual display informs the monitoring musician or technician that the monitored note was played after the reference note and informs the monitoring musician or technician of the amount of time between the reference note and the monitored note.

If the monitored note and reference note are played simultaneously or within the tolerances set by the measuring apparatus, the timing clock receives a start and stop signal at substantially the same time. In this case, the operating time of the timing clock is so small that a determination of the elapsed time between the start and stop signals cannot be accomplished. If the indicator cannot determine a lapse of time between the start and stop signals for the timing clock, the present invention informs the monitoring musician or technician that the monitored note is substantially on beat with the reference note.

DETAILED DESCRIPTION OF THE PREFERRED EMBODIMENT

Figure 1:
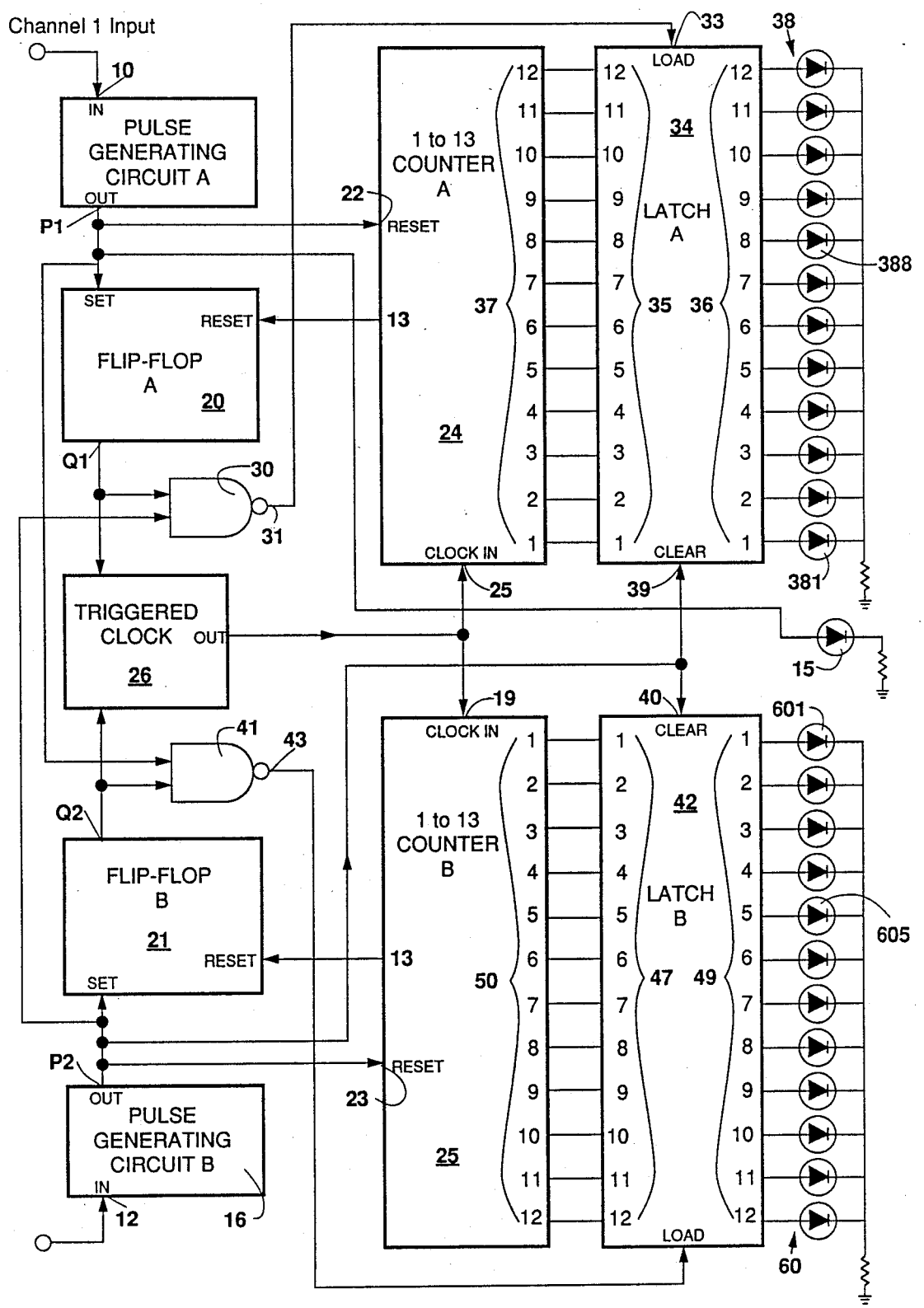
FIG. 1 is a block diagram of the present invention.
Figure 2:
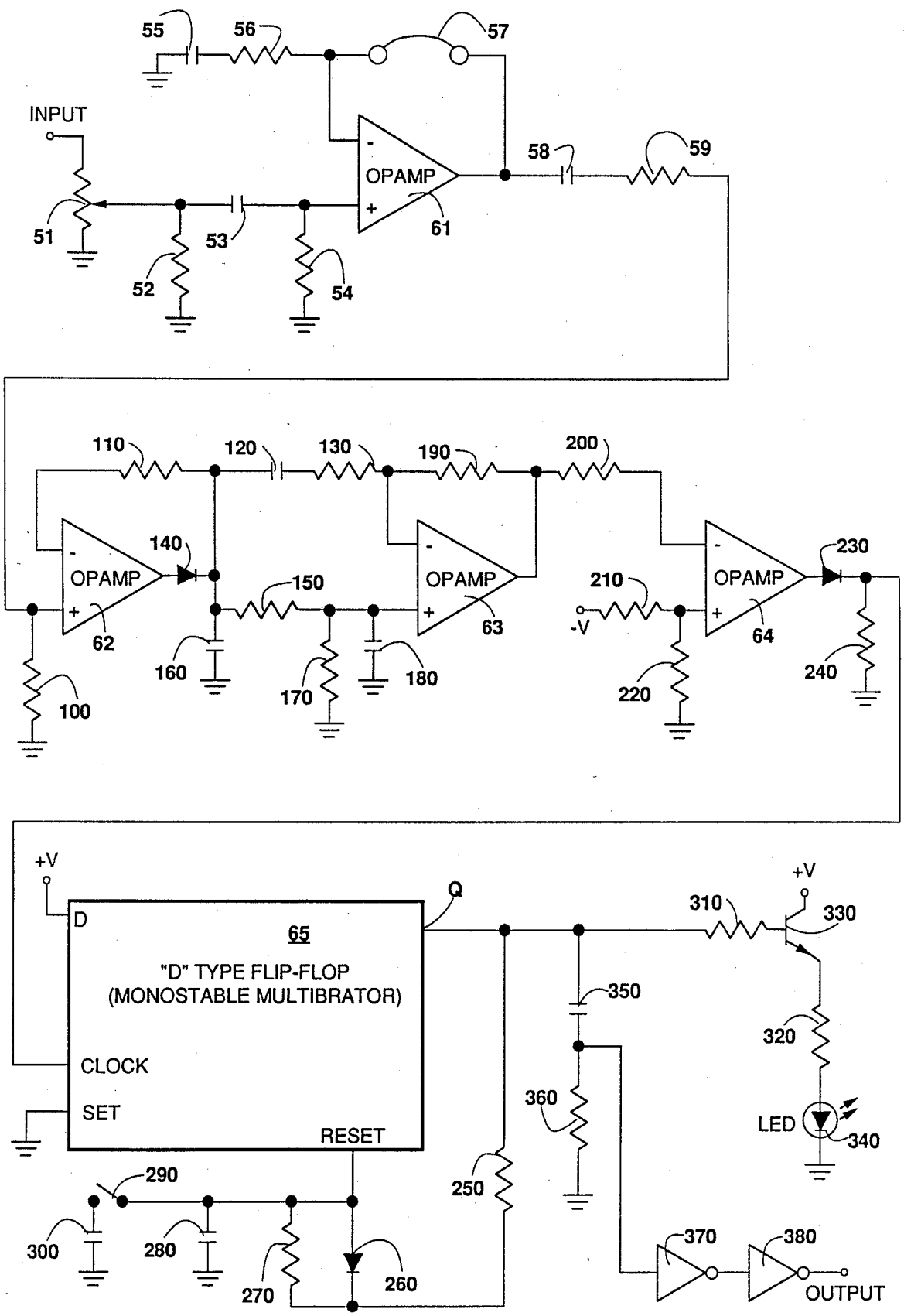
FIG. 2 is a circuit diagram of the pulse generating circuit of the present invention.

Referring to FIG. 1 note that the present invention has two inputs. Channel one input 10 is shown at the top left of FIG. 1. Channel one is also referred to as the reference or metronome input. Channel two input 12 is shown at the bottom left of FIG. 1. Channel two receives the signal of the sound whose timing is to be checked or verified. Both inputs are set up to receive electrical audio signals. These audio signals are converted to well behaved pulse signals by pulse generating circuit A 14 and pulse generating circuit B 16. The details of the pulse generating circuit are shown in FIG. 2 and will be discussed below.

FIG. 1 may be used to describe three situations illustrating the function of the present invention. In Example 1, channel one receives a first signal and then a short time later (0.5 seconds to 0.1 milliseconds) channel two receives a second signal. In Example 2, channel two receives a first signal and then a short time later channel one receives a second signal. In Example 3, the signals sent to both inputs arrive at the same time or less than 0.1 milliseconds apart.

EXAMPLE ONE

A first signal is received at the channel one input 10. The pulse generating circuit A converts it into a positive going narrow pulse P1 approximately 1 microsecond wide. The pulse P1 goes to the set input 18 on flip-flop A 20 and makes output Q1 of flip-flop 20 go high. It also goes to the reset input 22 of the 1 to 13 counter A 24, and resets the counter to a count of "1".

Figure 3:
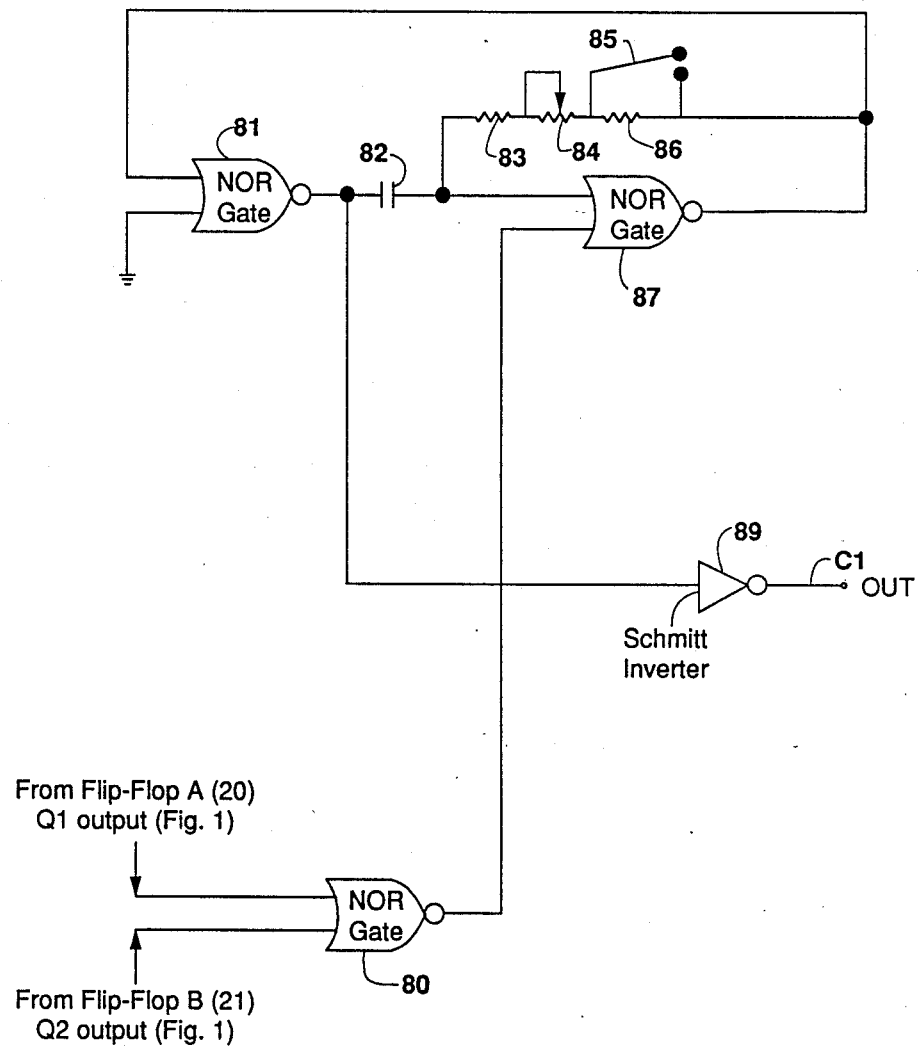
FIG. 3 is a circuit diagram of the triggered clock of the present invention.

When the output Q1 of flip-flop A 20 goes high, the triggered clock 26 is started. The 1 to 13 counter 24 receives the clock output signal C1 at clock in 25 and counts up on each clock pulse. The circuit diagram of the triggered clock 26 is shown in FIG. 3 and will be discussed below. The time it takes the 1 to 13 counter 24 to count to 13 is determined by the rate of the triggered clock 26. The rate of the triggered clock is variable. In the present example it may be assumed that it is set for a frequency of 1 KHz or 1 millisecond per pulse. The time during which the counter A24 is counting from 1 to 13 is very important. The channel two input 12 either will (Situation 1A) or will not (Situation 1B) receive a second signal during this time.

Figure 4A:
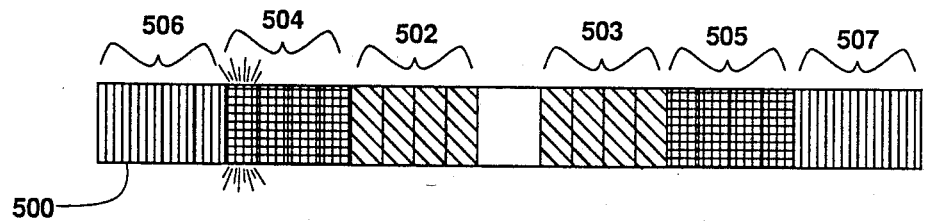
FIG. 4A illustrates the display of a "late" percussive transient signal as indicated by the present invention.

SITUATION 1A: A second signal arrives at channel two during the count up. The pulse generating circuit B 16 will output a positive going spike P2 that will make NAND gate A 30 go low, since the other input to the NAND gate A 30 is the Q1 output of flip-flop A 20 which is high at this time. The amount of time that the NAND gate A 30 is low is determined by the width of the pulse P2 generated by the pulse generating circuit B 16. The output 31 of NAND gate A 30 is sent to the load input 33 of latch A 34. On the ground to positive transition of the signal, the latch A 34 sends the signal at its inputs 35 to its outputs 36. Note that the latch A's inputs 35 are connected to the 1 to 13 counter A's outputs 37. Each of the latch's 12 outputs 36 is connected to a separate LED 38. If, for example, the counter had advanced to "8" when the signal came in the channel two input, the "8" count would be loaded into the latch A34, and the "8th" LED 388 would light. The 1 to 13 counter A 24 keeps on counting until it reaches "13", at which time it resets flip-flop A 20. The eighth LED 388 is lit showing that 8 milliseconds elapsed between the time the first signal came into the channel one input until the second signal came into the channel two input. Thus, during operation of the present invention, the reference signal (metronome) has triggered a "signal" and the input to channel two (the performer) has struck his note approximately 8 milliseconds "late;" this is thus visually indicated on the indicator face 500 of the present invention as illustrated in FIG. 4A.

SITUATION 1B: A second signal does not come into the channel two input during the count up. This is the case where the performer has either not struck a note or struck one so late it is off scale for the indicator settings. The 1 to 13 counter A24 counts all the way up to "13" and resets the flip-flop A 20. The LED's 38 connected to the latch outputs 36 do not change status. It should be noted that the output P2 of pulse generating circuit B 16 is connected to the clear input 39 and 40 of both latches A 34 and B 42. If channel two receives a signal after the count to 13 is done, the display LED's 38 and 60 are cleared. Thus, the performer has either not struck his note or struck his note too far off from the reference note to register on the display of the invention. In our present illustration, the triggered clock 26 is set at a frequency of 1 millisecond per pulse. And, there are 12 LED's to measure time before the beat and 12 LED's to measure time after the beat. So there is a 24 millisecond "target" around the reference beat for the performer to aim at. If the performer continually hits outside the target, no information is given to him on the display to indicate if he is playing too early or too late. He may make the target area "larger" by slowing down the speed of the triggered clock 26, so that each LED represents a longer amount of time. The triggered clock 26 is shown in detail in FIG. 3.

EXAMPLE TWO

A first signal comes in the channel two input 12. The pulse generating circuit B 16 converts it into a positive going narrow pulse P2 approximately 1 microsecond wide. The pulse P2 goes to the set input 17 of flip-flop B 21 and makes output Q2 of the flip-flop 21 go high. It also goes to the reset input 23 of the 1 to 13 counter B 25, and resets the counter 25 to a count of "1". When the output Q2 of flip-flop B 21 goes high, the triggered clock 26 is started. Counter B 25 receives the clock signal C1 at 19 and starts its count from "1" to "13". The channel one input 10 either will (Situation 2A) or will not (Situation 2B) receive a second signal during this time.

Figure 4B:
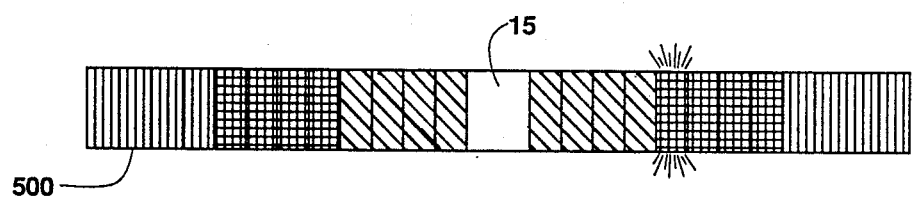
FIG. 4B illustrates the display of an "early" percussive transient signal as indicated by the present invention.

SITUATION 2A: A second signal arrives at channel one 10 during the count up. The pulse generating circuit A 14 will output a positive going spike P1 that will make NAND gate B 41 go low. The other input to the NAND gate B 41 is the Q2 output of flip-flop B 21 which is high at this time. The amount of time that the NAND gate B 41 is low is determined by the width of the pulse P1 generated by the pulse generating circuit A 14. The output 43 of NAND gate B 41 is sent to the load input 45 of latch B 42. On the ground to positive transition of the signal, the latch B 42 sends the signal at its inputs 47 to its outputs 49. Note that the latch B's inputs 47 are connected to the 1 to 13 counter B's outputs 50. Each of the latch's 12 outputs 49 is connected to a separate LED 60. If, for example, the counter 25 had advanced to "5" when the second signal came in the channel one input 10, the "5" count would be loaded into the latch 42, and the "5th" LED 605 would light. The 1 to 13 counter B 25 keeps on counting until it reaches "13", at which time it resets flip-flop B 21. The fifth LED 605 is lit showing that 5 milliseconds elapsed (assuming the clock is set for a period of 1 millisecond per pulse) between the time the first signal came into the channel two 12 input until the second signal came into the channel one input 10. Thus, during operation of the present invention, the performer has struck his note approximately 5 milliseconds "early;" this is thus visually indicated on the indicator face 500 of the present invention as illustrated in FIG. 4B.

SITUATION 2B: A second signal does not come into the channel one input 10 during the count up. This is the case when the performer has struck his note far too early to even register on the display. The 1 to 13 counter B 25 counts all the way up to "13" and resets the flip-flop B 21. The LED's 60 were cleared as soon as the input came into channel two so the LED display is blank. If channel one receives a second signal after the count to 13 is done, nothing changes. The LED display stays blank.

EXAMPLE THREE

Figure 4C:
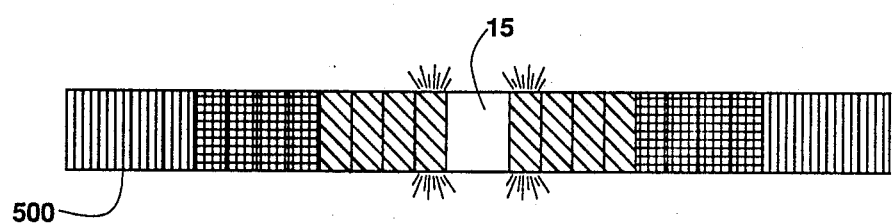
FIG. 4C illustrates the display of an "on-time" or "correct" percussive transient signal as indicated by the present invention.

The signals sent to both inputs 10 and 12 arrive at the same time (less than 1 millisecond apart in this reference example). It should be understood that response time of the apparatus is variable depending upon the frequency of the triggered clock 26. Both counters 24 and 25 are reset to "1" at the same time. Both latches 34 and 42 get loaded at the same time making outputs 36-1 and 49-1 both go high. Both LED's 381 and 601 are now lit as illustrated in FIG. 4C. This is the only situation in which two LED's are lit on the display at the same time.

This special condition of the display indicates that the monitored note is substantially on beat with the reference note. The visual effect of the two LED's being lit is significant in that the performer may easily determine that he is on target. This on-target situation has been termed "Snake Eyes."

LED 15 is provided as a target LED. It blinks on each occurrence at the reference or metronome input 10. This provides the musician with a visual means of knowing when the reference signal happens. When P1 goes high, the LED 15 is illuminated.

FIG. 2 illustrates the circuit diagram pulse generating circuit. The input signal goes thru potentiometer 51 which sets the sensitivity of the circuit. Opamp 61 is a preamp stage that makes the indicator of the present invention sensitive enough to trigger off low level signals. If more gain is needed, jumper wire 57 can be replaced with an appropriate feedback resistor. Components 55 and 56 filter out unwanted low frequency information. Components 53 and 54 filter out unwanted high frequency information. Opamp 62 is a peak detector which converts the audio (AC) waveform to DC. Opamp 63 works as a differential amplifier. Capacitor 120 and resistor 130 form a high pass filter, while capacitor 180 and resistor 170 form a low pass filter. When fed with the DC voltage generated by the Opamp 62 circuit, if the DC voltage rises rapidly, capacitor 120 lets that transition through. On the other hand, capacitor 180 smooths out that transition somewhat since it is acting as a low pass filter. Thus Opamp 63 sees a large differential voltage between its two inputs, and produces a negative-going pulse of energy at its output. Once the transition is over, this differential voltage becomes small, meaning that Opamp 63 output returns to being constant. This negative-going pulse is sent to Opamp 64 which is an inverting comparator. It shapes the signal into a clean pulse. The value of resistor 210 is approximately 100 Kohms and resistor 220 is approximately 1 Kohm. The pulse width of the output of Opamp 64 is inconsistent, so the signal is now run to a "one-shot" type circuit. The monostable multivibrator 65 is a non-retriggerable circuit so that no "double triggering" occurs from long input signals (audio signals through variable resistor 51). Components 270 and 280 set the non-retrigger time of the circuit. Capacitor 300 can be switched in using switch 290 to make the time longer. The output Q of the multivibrator 65 goes through components 350 and 360 to Schmitt inverter 370. It makes a narrow down-going pulse when the output of the one shot first starts to go up. Inverter 380 changes the signal into a positive going pulse. The output Q of the multivibrator 65 also goes through transistor 330 to LED 340 to show when the pulse generating circuit is working. LED 340 is observable to the operator on the back of the indicator console to show that a signal is being received in the apparatus.

FIG. 3 illustrates the circuit diagram of the triggered clock 26. Gates 81 and 87 are connected to capacitor 82 and resistors 83, 84, and 86 to form an astable multivibrator circuit. Note that one input to gate 81 is grounded, so it is actually working as an inverter. When the output of gate 80 goes low, gate 87 acts like an inverter and we see a typical astable or oscillator circuit. Note the circuit only oscillates when the output of gate 80 goes low. A clock that is triggered, or started at a specific instant, is necessary in this invention so that the timing always starts on a full pulse width of the clock. If the clock 26 were running at random, the timing might accidentally start right in the middle of a clock pulse. That pulse of the clock 26 would have to finish before any clocking of either counter 24 or 25 could occur. When either input signal to gate 80 goes high, the output of the gate goes low. This enables the clock to run. The frequency of the clock is set by capacitor 82 and resistors 83 and 84. Resistor 84 is a potentiometer for setting the rate. Resistor 86 changes the range of frequency by being switched in via switch 85. The Schmitt inverter 89 conditions the clock so that the up and down transition are very sharp.

Thus it may be noted that a whole range of "sensitivity" settings may be established by varying switch 85. An operator may access the sensitivity switch 85 at the rear of the console of the unit.

In the present invention the display LED's are set in a horizontal, linear array on the face panel 500 of the unit console as illustrated in FIGS. 4A-4C. Further, visual indications of accuracy are provided by having the first four (4) LED's 502 and 503 on either side of the target LED 15 of the LED display illuminate "green" to signify a "close enough" condition; the next four (4) LED's 504 and 505 on either side illuminate "orange" to indicate "caution"; and the last four (4) LED's 506 and 507 illuminate "red" to indicate "extreme" inaccuracy either too early or too late.

It is possible further to utilize any number of visual scales which display a temporal discrepancy between the reference input and the performer's input.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A visual indicator of temporal accuracy of compared percussive transient signals comprising:
   means for receiving a reference percussive transient input signal;
   means for receiving a performance percussive transient input signal;
   means for determining whether said reference input signal receiving means or said performance input signal receiving means first received a first percussive transient input signal and for further determining the time difference between when said first percussive transient input signal is received and when a second percussive transient input signal is received by either said reference input signal means receiver or said performance input signal means receiver, whichever did not first receive said first percussive transient input signal; and
   means for visually displaying whether said reference percussive transient input signal or said performance percussive transient input signal was first received and said time difference of reception of said first percussive transient input signal and said second percussive transient input signal.

2. The indicator of claim 1 wherein said means for displaying further comprises a linear array of LED's positioned to display the amount of time said performance percussive transient input signal is received before or after said reference percussive transient input signal is received.

3. The indicator of claim 2 wherein two of said LED's positioned centrally along said display illuminate when said first percussive transient input signal and said second percussive transient input signal are received by said indicator at substantially the same time.

* * * * *